United States Patent
Wolter

[11] 3,880,439
[45] Apr. 29, 1975

[54] SELF STEERING MECHANISM

[75] Inventor: Karl Wolter, Clarkson, Ontario, Canada

[73] Assignee: Levy-Russell Limited, Toronto, Ontario, Canada

[22] Filed: Dec. 20, 1973

[21] Appl. No.: 426,906

[52] U.S. Cl. .......................... 280/81 A; 180/79.2 R
[51] Int. Cl. ............................................. B62d 53/06
[58] Field of Search ................. 180/79.2 R, 79.2 C; 280/81 A, 81 R, DIG. 9

[56] References Cited
UNITED STATES PATENTS

| | | | |
|---|---|---|---|
| 2,390,912 | 12/1945 | Ayers | 280/81 A |
| 3,000,457 | 9/1961 | Randol | 180/79.2 R |
| 3,284,094 | 11/1966 | Grace | 28/81 A |
| 3,354,982 | 11/1967 | Schramm | 180/79.2 R |
| 3,403,925 | 10/1968 | Sauer | 280/81 A |
| 3,522,956 | 8/1970 | Sauer | 280/81 A |
| 3,656,776 | 4/1972 | Steiner | 280/81 A |

Primary Examiner—David Schonberg
Assistant Examiner—T. L. Siemens
Attorney, Agent, or Firm—Rogers, Bereskin & Parr

[57] ABSTRACT

A self steering mechanism for the rear wheels of truck trailers. Each wheel has a positive castor and is connected to an inner and an outer steering tie rod to a cam. A locking pin normally holds the cam from rotating and thereby prevents steering of the rear wheels. A pneumatic steering valve is located between the inner and outer tie rods of each wheel. When the trailer turns, the wheels attempt to self steer due to their castor and exert force on the tie rods, activating one of the valves, which causes the locking pin to be withdrawn from the cam, permitting steering of the rear wheels. At the same time, the steer valve actuates a pneumatic bellows which acts on the tie rods opposite those between which the actuated steering valve is located, to power assist the steering action. A separate control keeps the cam locked during backing up, to prevent self steering at such time.

9 Claims, 7 Drawing Figures 3,880,439

SELF STEERING MECHANISM

This invention relates to a self-steering mechanism for use with the trailed rear wheels of multi-axle road vehicles such as tractor trailers.

The trailers used in present tractor trailer combinations are commonly quite long and usually have two or more axles spaced apart. In recently built trailers there has been a tendency to space the axles apart by a considerable distance, to provide more uniform support for the trailer. Unfortunately, the wide spacing of the axles causes the trailer wheels to slide or skid over the surface of the roadway when the trailer is pulled through a turn. The skidding occurs because the trailer wheels are normally mounted to roll only in a straight forward and rearward position and are unable to steer. The skidding drastically reduces the life of the trailer tires and in addition causes vibration and wear in the trailer itself.

Because of these difficulties, self-steering mechanisms have been proposed for the rear wheels of trailers. Such self-steering mechanisms usually provide a caster mounting for the trailer wheels so that the wheels will tend to turn in the direction in which the trailer is turning. In order to prevent too fast a steering action, various spring arrangement have been employed to ensure a slow progressive steering of the wheels under the caster force. However, so far as is known, all arrangements so far proposed either resist unduly the steering of the wheels, or else they allow the wheels to vibrate from side to side when the trailer is being pulled forwardly at high speed.

Accordingly, it is an object of the present invention to provide a self-steering mechanism which allows the wheels to steer in the direction of a turn, and which preferably provides some power assist for the steering, and which at the same time positively locks to reduce wheel vibration when the vehicle on which the mechanism of the invention is mounted is pulled straight ahead.

In this broadest aspect the invention provides a self-steering mechanism for the trailing wheels of a vehicle, comprising:

1. suspension means for said vehicle,
2. means mounting said wheels to said suspension means so that said wheels tend to steer in the direction of a forward turn of said vehicle,
3. steering linkage means interconnecting said wheels,
4. locking means connected between said suspension means and said steering linkage means, said locking means having a first normal condition and a second operated condition,
5. said locking means including means operative when said locking means is in its first normal condition to bias said steering linkage means towards a centre position in which said wheels are in a straightened position, and to prevent movement of said steering linkage from said centre position thus preventing steering of said wheels; said locking means when in said second operated condition permitting movement of said steering linkage means and hence permitting steering of said wheels,
6. valve means connected with said steering linkage means and operative in response to steering pressure of a said wheel,
7. and means connecting said valve means to said locking means for operation of said valve means to operate said locking means to its second condition thereby to permit steering movement of said wheels, said valve means being responsive to termination of such steering pressure to terminate operation of said locking means, whereby said locking means then biases said steering linkage to its said centre position.

Further objects and advantages of the invention will appear from the following description, taken together with the accompanying drawings, in which:

FIG. 3 is a view of a wheel mounting taken along lines 3—3 of FIG. 1;

Figure 1:
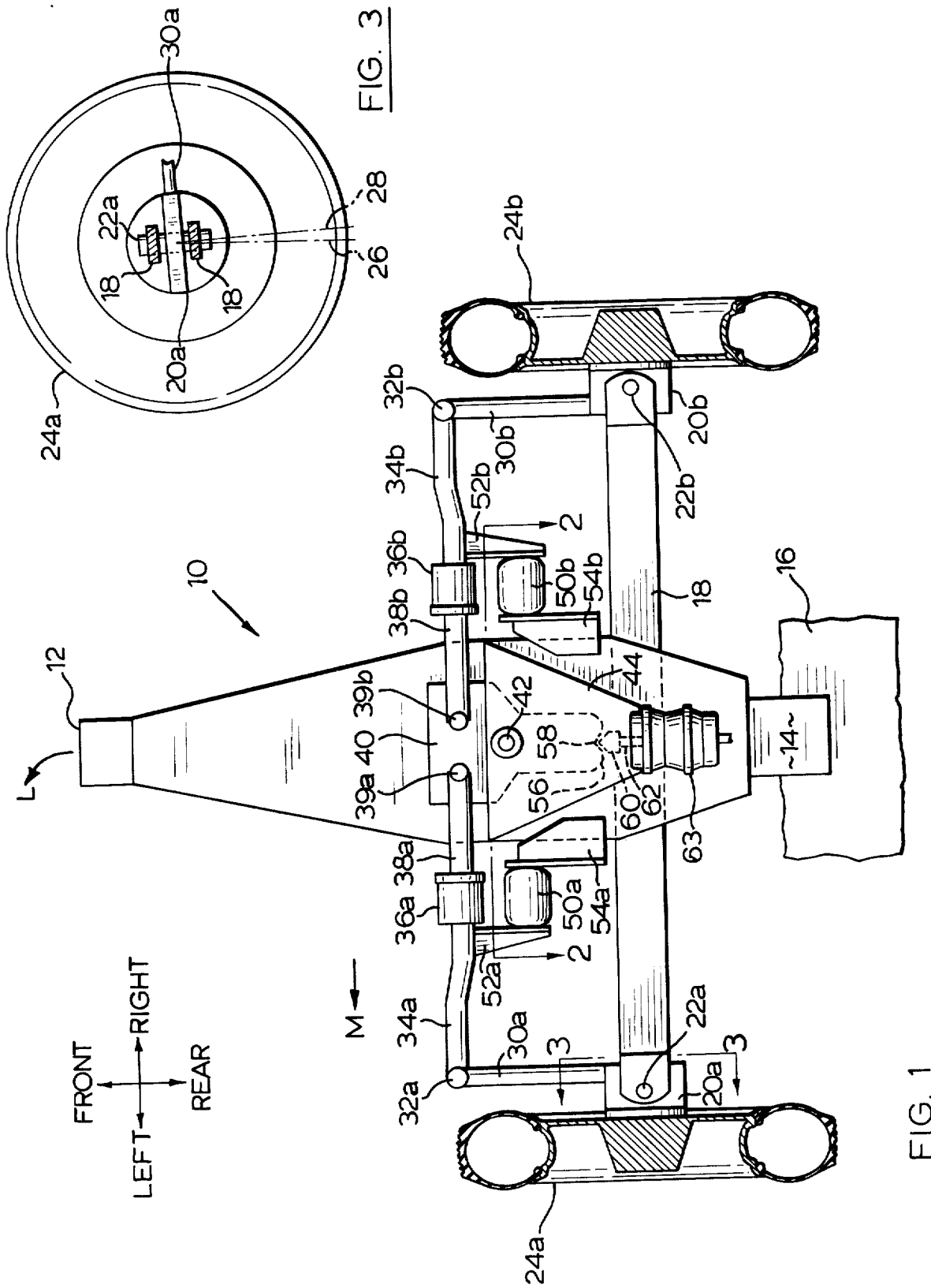
FIG. 1 is a bottom view of a self-steering mechanism according to the invention oriented in a forward direction and showing a small part of a vehicle on which the machanism is mounted.
Figure 2:
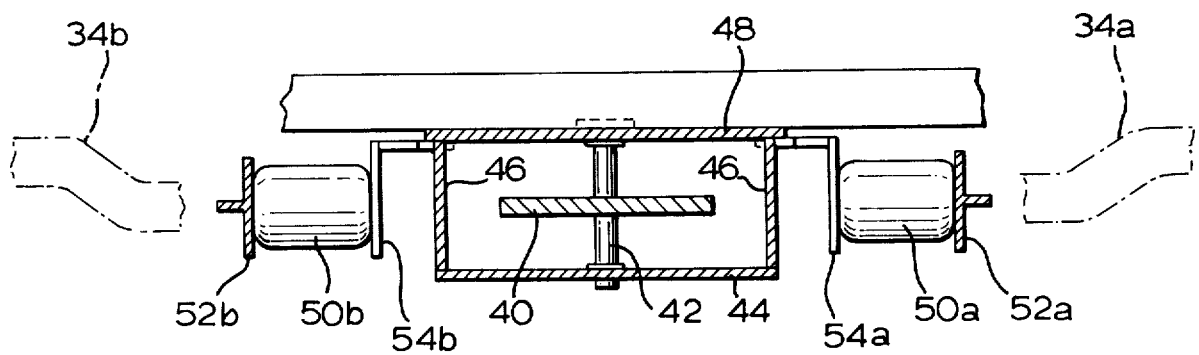
FIG. 2 is a partial sectional view taken along lines 2—2 of FIG. 1.

Reference is first made to FIGS. 1 and 2, which show a conventional suspension assembly generally indicated at 10 and having a drawbar 12 and a rear mount 14 adapted to be mounted to a trailer. A portion of the bottom surface of the trailer is indicated at 16 in FIG. 1. The notation shown beside the drawbar 12 indicates the orientation of the trailer.

The suspension assembly 10 includes a conventional solid axle 18 rigidly secured to the suspension assembly 10 (by means not shown). Wheel mounts 20a, 20b are pivotally mounted at the ends of the axle 18 by kingpins 22a, 22b and wheels 24a, 24b are rotatably mounted on the mounts 20a, 20b (The symbols a and b are used to distinguish between left hand and right hand parts respectively of the mechanism; such parts are identical except for their left-hand and right-hand construction.)

The axes of the kingpins 22a, 22b are inclined at a castor angle (FIG. 3) so that the point of contact 26 between each wheel and the ground trails the interrsection 28 of the kingpin axes with the ground. This positive castor causes the wheels to tend to steer in the direction of a turn as trailer 16 travels forwardly. The castor angle, which is conventional, is shown exaggerated in FIG. 3 for purposes of illustration.

A steering linkage is connected to the mounts 20a, 20b and is arranged as follows. A steering arm 30a, 30b is rigidly connected to each mount 20a, 20b and is pivotally connected at 32a, 32b to an outer tie rod 34a, 34b. Each outer tie rod 34a, 34b is connected to one end of a steering valve 36a, 36b (to be described), and the other end of each such steering valve is connected to the outer end of an inner tie rod 38a, 38b. The inner ends of the inner tie rods 38a, 38b are pivotally connected at 39a, 39b to a pivot plate 40. The pivot plate 40 is pivotally mounted at 42 in a box structure consisting of a lower plate 44 (FIG. 2) secured by side plates 46 to a top plate 48 secured beneath axle 18. Thus, when the wheels 24a, 24b are steered, the pivot plate pivots either to the left or the right with the wheels.

Power steering means are provided, consisting of bellows 50a, 50b, one for the left hand tie rod 34a and one for the right hand tie rod 34b. Each bellows 50a, 50b is typically of heavy rubber or other suitable material and is mounted between a plate 52a, 52b rigidly secured to the outer tie rod 34a, 34b and another plate 54a, 54b rigidly secured to the suspension assembly 10. When one of the bellows inflates, it forces the entire steering linkage to the side on which the inflated bellows is located (e.g., if bellows 50a is inflated, it steers the wheels to the left). The operation of the bellows 50a, 50b is controlled by the valves 36a, 36b, as will be described shortly.

The end of the pivot plate 40 opposite the tie rod pivots 39a, 39b is provided with a heart-shaped cam surface 56 having curved sides which meet at an apex, thus forming a generally V-shaped indent 58. The head 60 of a locking pin 62 is normally disposed within the indent 58, locking the pivot plate 40 against rotation and preventing the wheels from steering. When either steering valve 36a, 36b is actuated, however, the locking pin 62 is caused to be withdrawn rearwardly from the pivot plate 40 by a locking cylinder 63, as will be described.

Figure 4:
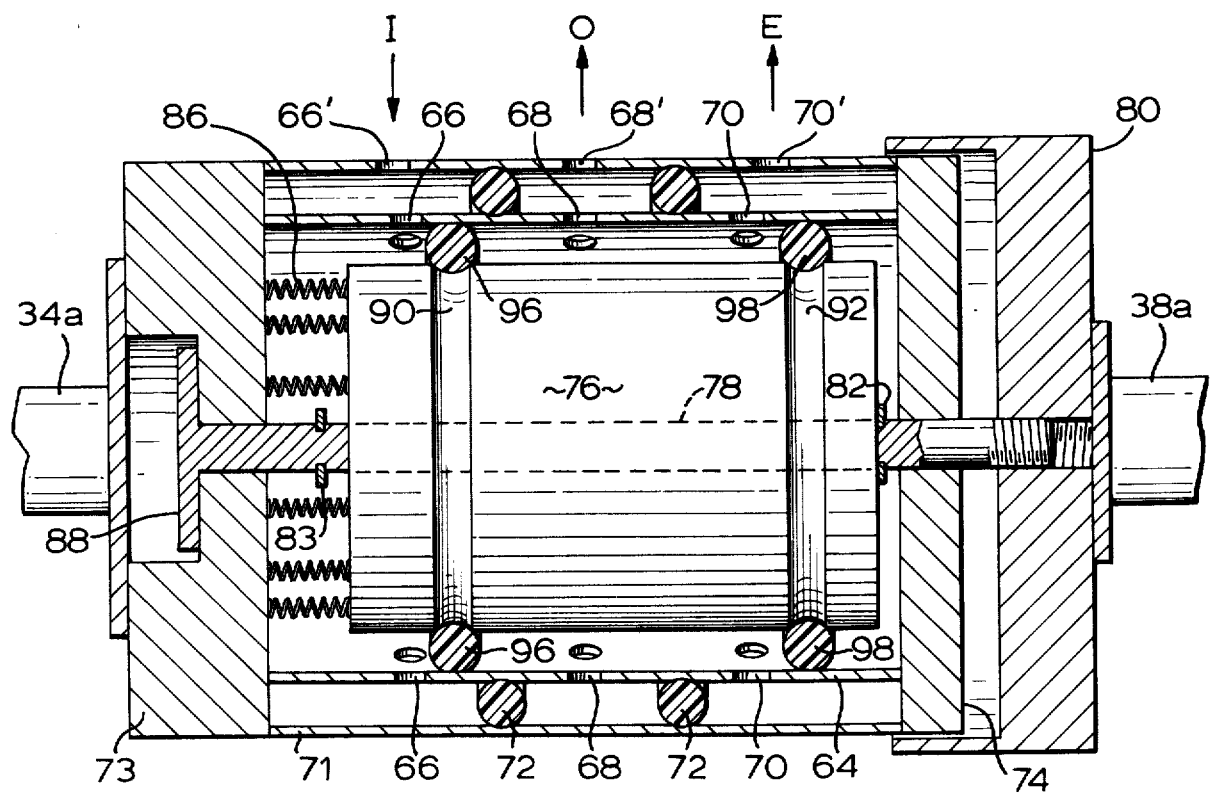
FIG. 4 is a simplified diagrammatic sectional view of a steering valve.

Each steering valve 36a, 36b is conventional and is typically a model APS-880 Torque Valve produced by The Air-O-Matic Power Steer Company, a division of Sycon Corporation, of Marion, Ohio, U.S.A. This valve is a double acting valve (i.e., when it is pushed in one direction, air is directed out one port, and when it is pushed in the opposite direction, air is directed out a different port), but since only half of this capability is needed in the invention, FIG. 4 illustrates half of the valve 36a, is simplified diagrammatic form. As shown in FIG. 4, the valve 36a includes a sleeve 64 having a number of circumferentially spaced inlet holes 66, outlet holes 68, and exhaust holes 70. The arrows I, O and E indicate inlet, outlet, and exhaust respectively. The sleeve 64 is encircled by a larger diameter outer casing 71 having single inlet, outlet and exhaust ports 66', 68', 70' and spaced from the sleeve by O-rings 72. The sleeve 64 and casing 71 are closed by end caps 73, 74.

Located within the sleeve 64 is a valve spool 76. The spool 76 is mounted on a plunger 78 which extends slidably through the end caps 73, 74 and through the spool and is then screwed into a flanged cover cap 80. Relative movement of spool 76 to the right on plunger 78 is prevented by a spring washer 82 seated in a groove in the plunger. The spool 76 is biased to the right, away from end cap 73, by a number of small coil springs 86 located between the end cap 73 and the spool.

It will be seen that the sleeve 64 and casing 71 are able to move axially as a unit relative to the plunger. However, such axial movement of the sleeve 64 and casing 71 is limited (typically to between 1/8 and 1/16 inch) by the enlarged plunger head 88 on one side of the cap 73, and by the spring washer 83 mounted in a groove in the plunger 78 on the other side of the cap 73. The end cap 73 is secured to the outer tie rod 34a (e.g. by welding) while the cover cap 80 is secured to the inner tie rod 38a (again typically by welding).

The valve spool 76 is conventional and includes two spaced grooves 90, 92 in which are seated narrow O-rings 96, 98.

In the normal condition of the valve, as shown in the drawing, with the wheels in a straightened position, air enters inlet port 66' and inlet holes 66 but is blocked by O-ring 96 from reaching outlet holes 68. At the same time, outlet port 68' communicates via holes 68, 70 with casing exhaust port 70'. When outer tie rod 34a is pushed to the right as drawn, this carries the sleeve 64, casing 71, and end caps 73, 74 as a unit to the right relative to the cover cap 80, plunger 78 and spool 76. The O-rings 96, 98 in effect move to the left to disconnect the sleeve outlet holes 68 from the sleeve exhaust holes 70 and to connect the sleeve outlet holes 68 instead to the sleeve inlet holes 66. This allows air from inlet port 66' to exit through the sleeve outlet holes 68 and the casing outlet port 68'. The valve is proportional, meaning that when the sleeve 64 is moved more to the right, a greater area of the sleeve inlet holes 66 is moved past the O-ring 96 to be connected with the sleeve outlet holes 68, and a lesser area of the sleeve exhaust holes 70 is connected with the sleeve outlet holes 68, to reduce the rate of exhaust. The rate of flow through the outlet holes 68 and outlet port 68' thus increases. When the compressive force on the valve is removed, the springs 86 return the sleeve 64, with the casing 71 and end caps, to the initial condition drawn. Since the maximum travel of the sleeve is between 1/16 and 1/8 inch, the valve can also transmit forces (both tension and compression) through the steering linkage with only slight lost motion.

In operation, assume that the vehicle makes a left hand turn in the direction of arrow L (FIG. 1). In that event, both wheels 24a, 24b will tend to steer to the left, but steering is substantially prevented by the presence of locking pin head 60 seated in the indent 58 in pivot plate 40. As the wheels 24b attempts to turn, the resultant compressive force exerted against valve 36b by the outer tie rod 34b moves the valve sleeve of valve 36b to the left, causing air to exit through the outlet port of valve 36b. This air, by means to be described, causes the locking pin 62 to be withdrawn rearwardly, so that pivot plate 40 is free to turn. At the same time the air from the outlet port of valve 36b inflates bellows 50a. The caster force exerted on the wheels 24a, 24b now causes them to steer, and at the same time the expansion of bellows 50a pushes the plate 52a and hence the left hand outer tie rod 34a in the direction of arrow M. The tension force transmitted through the left hand valve 36a pulls the left hand inner tie rod 38a in the direction of arrow M, thus turning the pivot plate 40 and easing the resistance against which the right hand part of the steering linkage turns. The harder the turn, the more valve 36b is compressed, and the faster air flows into bellows 50a. The extend of the power assist is self-limiting, however, because if bellows 50a inflates too much and moves the steering linkage too much in the direction of arrow M, this will pull the right hand inner tie rod 38b in the direction of arrow M with a force greater than that exerted on the valve 36b by the outer tie rod 34b. This will remove the compressive force on the right hand valve 36b, thus allowing the left hand bellows 50a to exhaust (by means to be described) at least temporarily.

As soon as the vehicle begins to straighten from its turn, the reverse procedure occurs. The wheels 24a, 24b begin to straighten from their turn, removing the compressive force from right hand valve 36b. The springs in the valve return the valve sleeve to its initial condition, allowing bellows 50a to exhaust and also allowing locking pin 62 to move forwardly (by means to be described). The locking pin head 60 presses against the cam surface 56 of the pivot plate 40, biasing the wheels to a straightened position. Depending on the curvature of the path of recovery from the turn, the left hand steering valve 36a may be compressed, causing the right hand bellows 50b to inflate and thus positively steering the right hand wheel 46b to a straight ahead condition. As the wheels straighten and as the compressive force on valve 36a is removed, bellows 50b deflates and locking pin 62 is allowed to move forwardly to bear against the cam surface 56 of pivot plate 40, further biasing the wheels to a straightened position.

Figure 5:
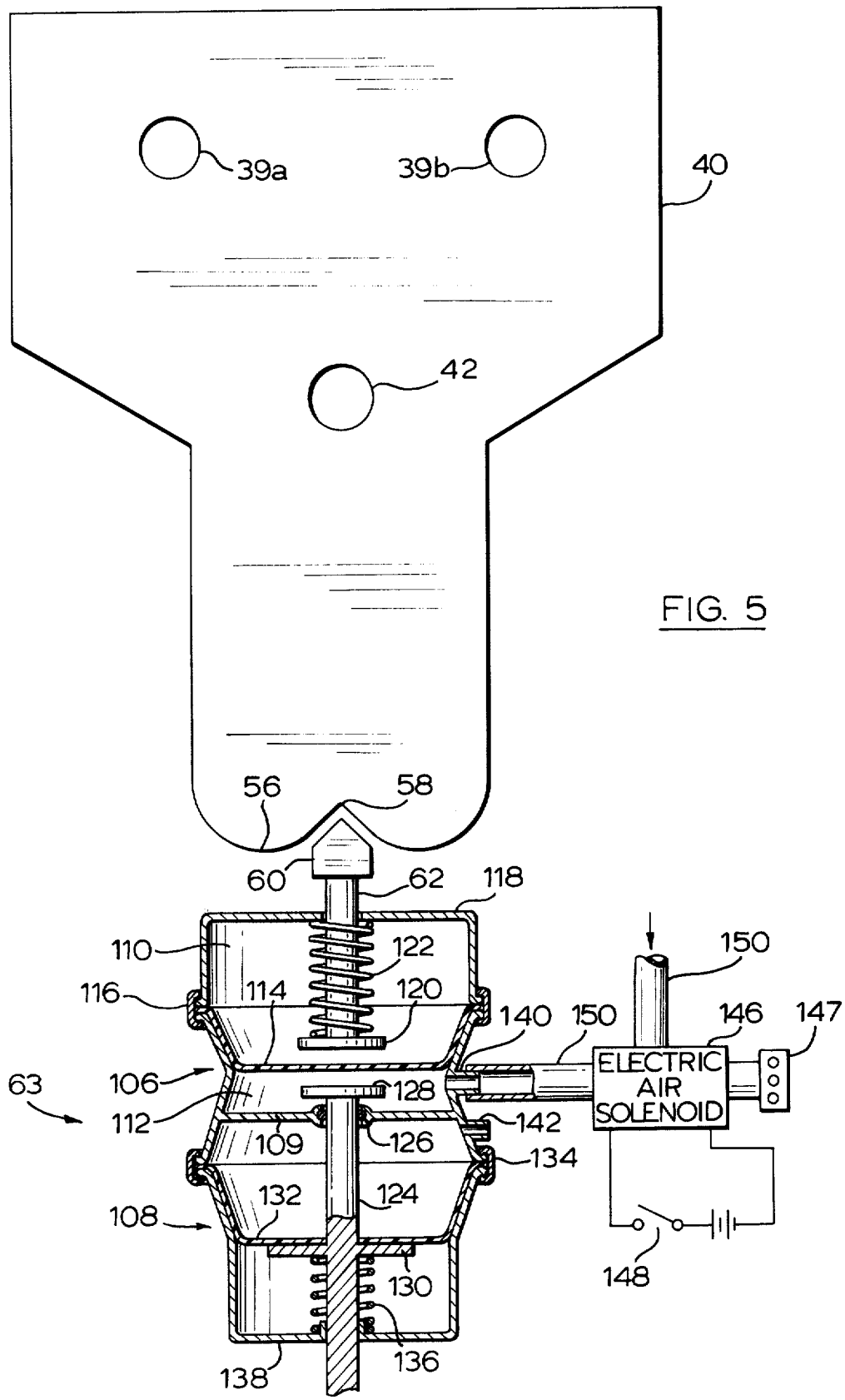
FIG. 5 is a sectional view of a pneumatically activated locking cylinder mechanism.

Reference is next made to FIG. 5, which shows diagrammatically the locking cylinder 63 which powers the movements of the locking pin 62. The locking cylinder 63 consists of two separate chambers, namely a front chamber 106 and a rear chamber 108, divided by a wall 109.

The front chamber 106 is divided into two separate compartments 110, 112, by flexible rubber diaphragm 114 secured to the chamber wall by a clamping ring 116. The locking pin 62 extends through the front wall 118 of the front chamber into the front compartment 110 and terminates in an enlarged end 120. A coil spring 122 encircles the shaft of the locking pin between the front wall 118 and the enlarged end 120 to bias the locking pin rearwardly toward the diaphragm 114.

A bias pin 124 extends from the rear chamber 108 through wall 109 into the rear compartment 112 of the front chamber 106. The point where the pin 124 passes through the wall 109 is sealed against escape of air by a seal 126. The bias pin 124 includes an enlarged head 128 which bears against the diaphragm 114, while towards its middle the pin 124 includes a plate 130 integral therewith. The plate 130 is secured to a diaphragm 132 which is in turn clamped at the edge of the rear chamber 108 by another clamping ring 134. A heavy coil spring 136 encircles the rear portion of the bias pin 124 and acts between the plate 130 and the rear chamber, to urge the bias pin 124 forwardly.

Air connections are provided into the rear compartment 112 of the front chamber 106 by a fitting 140, and into the front portion of the rear chamber 108 by a fitting 142.

In operation, when no air is supplied to the locking cylinder 63, the locking pin 62 is strongly urged to its forward position in which its head 60 presses against the pivot plate 40. The reason for this is that the rear coil spring 136 is substantially stronger than the front spring 122 and overcomes the pressure of the front spring to urge the locking pin 62 forwardly.

When one of the steering valves 36a, 36b is compressed to supply air to one of the bellows 50a, 50b, air from the steering valve is also directed to the coupling 142 and fills the front portion of the rear chamber 108, acting rearwardly against the diaphragm 132 and forcing the bias pin 124 rearwardly. This allows the front spring 122 to move the locking pin 62 away from the pivot plate 40, allowing the wheels to steer. As soon as the pressure on the compressed steering valve 36a, or 36b is released, this allows the air in the front part of rear chamber 108 to exhaust (by means to be described), permitting the spring 136 to force the bias pin 124 forwardly. This drives the locking pin 62 against the pivot plate 40 again.

When neither of the steering valves 36a, 36b is compressed, the locking pin 62 presses against the cam surface 56 of the pivot plate (and seats in the indent 58 when the wheels are straightened). This reduces wheel vibration during straight forward movement and during some stages of recovery from turns. Whenever the locking pin head 50 is withdrawn from cam surface 56, this is because one of the steering valves 36a, 36b has operated, inflating one of the bellows 50a, 50b, and the inflated bellows serves at this time to reduce vibration. In addition, since the speed of withdrawal of locking pin 62 is limited by the rate of which the operated steering valve injects air into the locking cylinder 63, the system can be adjusted so that locking pin head 60 normally remains in contact with cam surface 56 substantially throughout a turn, thus damping wheel vibration even when a steering valve 36a, or 36b is operated. In addition, since there is some time lag in the system, a momentary steering pressure on one wheel caused by a bump or the like will not effectively activate steering.

When the trailer is being backed up, the power assist must be disabled, since steering at this time would be in the opposite direction to that desired. For this purpose, an electrically operated air solenoid 146 is provided, connected to the back-up light switch 148 of the tractor pulling the trailer 16. When the tractor is reversed, the switch 148 closes, energizing the air solenoid 146 to allow air from supply duct 150 to enter the rear compartment 112 of front chamber 106 through conduit 152 and fitting 140. The air in compartment 112 positively forces the diaphragm 114 and hence the locking pin 62 forwardly, driving the locking pin head 60 hard against the pivot plate 40. This prevents steering of the trailer wheels 24a, 24b if the wheels are in a straightened position. If the wheels are initially in a turned position, then the air in compartment 112 cannot force the locking pin head 60 to the centre of the cam surface 56 while the trailer is stationary. However, when the trailer begins to back up, the locking pin head 60 will rapidly bias the wheels to a straightened position, at which time the locking pin head 60 will come to the centre of the cam surface where it will remain, preventing further turning of the wheel. When the vehicle transmission is again moved to a forward condition, the switch 148 opens and solenoid 146 exhausts the air in compartment 112 via exhaust port 147, allowing the self-steering to be reactivated.

Figure 6:
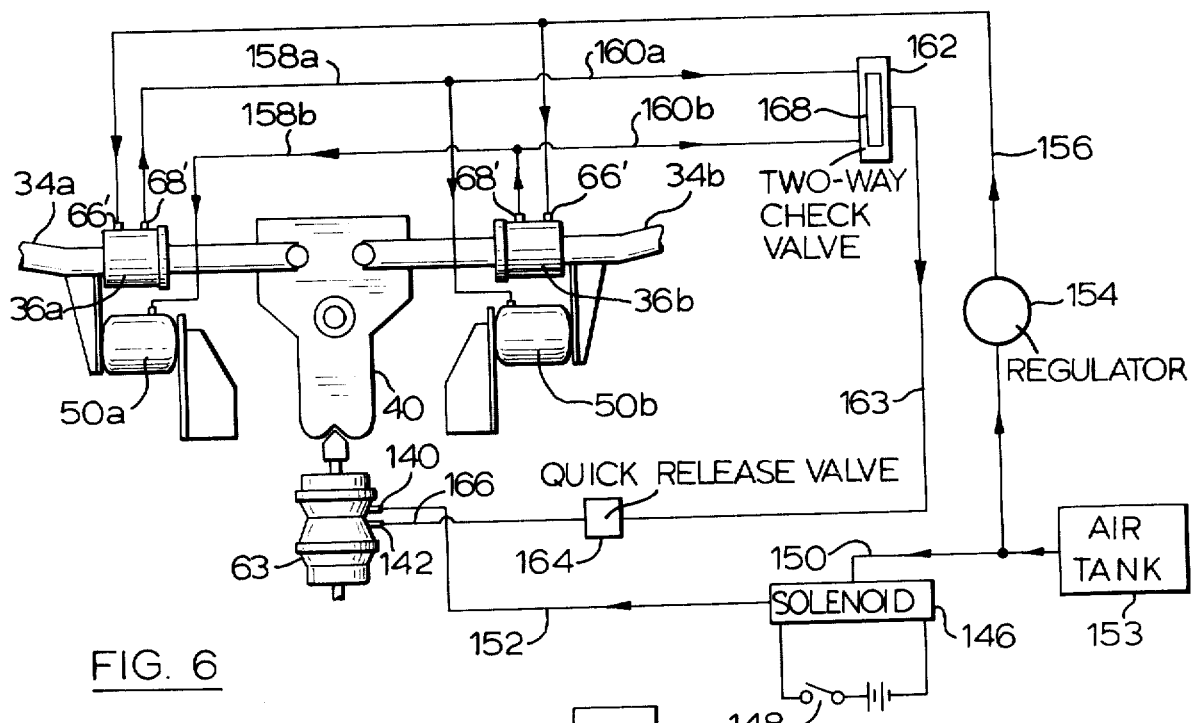
FIG. 6 is a schematic view of the pneumatic connections for the invention.

FIG. 6 is a schematic illustration of the pneumatic connections for the system. Air is supplied from the tractor air tank 153 through a regulator 154 which limits the air pressure to approximately 70 pounds, a pressure available in almost all vehicles having air brakes. From the regulator 154, the air passes through conduit 156 to the inlet ports 66' of the steering valves 36i a 36b. The outlet port 68' of valve 36a is connected via conduit 158a to the inlet of the opposite bellows 50b, while the outlet port 68' of valve 36b is connected via conduit 158b to the inlet of its opposite bellows 50a. In addition, the air from the outlet ports of the steering valves 36a, 36b is directed through conduits 160a, 160b and via a two-way check valve 162, conduit 163, quick release valve 164, and a conduit 166 to the fitting 140 of locking cylinder 63. The two-way check valve 162 is conventional and contains a spool diagramatically indicated at 168. The spool 168 moves upwardly (as drawn) when conduit 160b is pressurized and downwardly when conduit 160a is pressurized, allowing pressurized air from the conduit in question to enter the locking cylinder 63 while preventing the pressurized air from escaping. The quick release valve 164 is also conventional and opens the conduit 166 to atmosphere as soon as the pressure in conduit 163 is released. This allows pressurized air in the locking cylinder 63 to empty immediately, as soon as the steering valves are deactuated, so that the air in the locking cylinder 63 does not have to exhaust through the longer path through the steering valves.

The air supply for the solenoid valve 146 is derived directly from the air tank 153, in order that the locking pin head 60 will be driven into the pivot plate 40 with as much pressure as possible when the trailer is being moved in reverse. If desired, a manually operated switch for the back-up solenoid 146 may also be provided.

Figure 7:
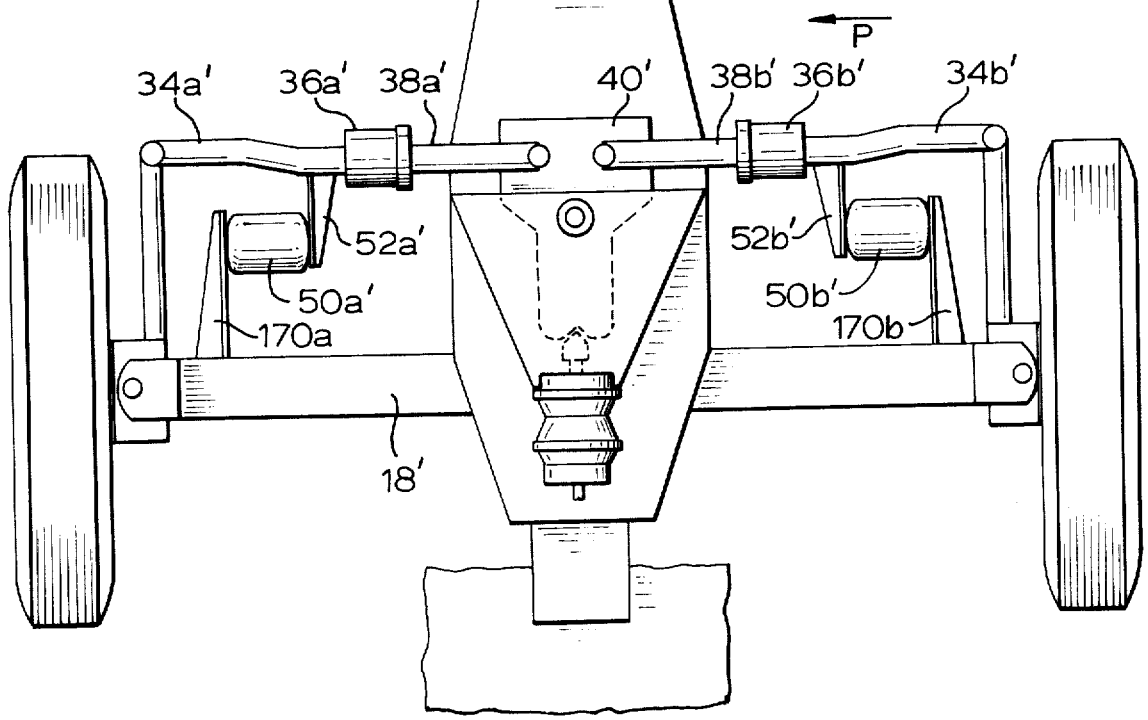
FIG. 7 shows a modification of the FIG. 1 arrangement.

Various changes may be made in the invention as described. For example, if desired, the system shown in FIG. 7 may be used, in which primed reference numerals indicate parts corresponding to those of FIGS. 1 to 6. The only way in which FIG. 7 differs from FIGS. 1 to 6 is that each bellows 50a', 50b' is connected between its plate 52a', 52b' and a second plate 170a, 170b connected to the axle 18'. Each plate 170a, 170b is located outwardly of its associated plate 52a', 52b'. In addition, the operation of each steering valve 36a', 36b' is reversed so that each valve is actuated by a tension force applied to it, rather than being actuated by a compressive force. Each steering valve is connected to its opposite bellows, as before. Thus, when the vehicle for example turns in the direction of arrow L, steering valve 36a' is extended and operates to inflate its associated bellows 50b', thus pushing the right hand outer tie rod 34b' in the direction of arrow P. For a right hand turn, steering valve 36b' is actuated and inflates bellows 50a'. It will be seen that the operation is exactly analogous to that of FIG. 1.

It will be realized that hydraulic or electric means may be used instead of pneumatic means to power assist the steering of the wheels and to operate the locking cylinder 63. In addition, various well known steering linkage configurations may be used in place of the specific tie rod arrangement shown, so long as means are provided to prevent sudden movements of the wheels and to force the wheels to a straight ahead position when the vehicle is moving straight ahead or in reverse.

If desired, the steering power assist provided by the bellows 50a, 50b may be completely eliminated, in which case the steering valves 36a, 36b will simply control the movement of the locking pin 62. However, it is preferred to provide some power assist for the steering, since this helps reduce wear on the tires and also provides additional damping which helps limit sudden movements of the wheels.

What I claim is:

1. A self-steering mechanism for the trailing wheels of a vehicle, comprising:
  1. suspension means for said vehicle,
  2. means mounting said wheels to said suspension means so that said wheels tend to steer in the direction of a forward turn of said vehicle,
  3. steering linkage means interconnecting said wheels,
  4. locking means connected between said suspension means and said steering linkage means, said locking means having a first normal condition and a second operative condition,
  5. said locking means including means operative when said locking means is in its first normal condition to bias said steering linkage means towards a centre position in which said wheels are in a straightened position, and to prevent movement of said steering linkage from said centre position thus preventing steering of said wheels; said locking means when in said second operated condition permitting movement of said steering linkage means and hence permitting steering of said wheels,
  6. valve connected with said steering linkage means and operative in response to steering pressure of a said wheel,
  7. and means connecting said valve means to said locking means for operation of said valve means to operate said locking means to its second condition thereby to permit steering movement of said wheels, said valve means being responsive to termination of such steering pressure to terminate operation of said locking means, whereby said locking means then biases said steering linkage to its said centre position.

2. A mechanism according to claim 1 and including power means for power assisting the steering of said wheels, and connecting means connecting said power means with said valve means for operation of said valve means, consequent upon exertion by a wheel of steering pressure in a given direction, to operate said power means to assist the steering of at least one of said wheels in said given direction.

3. A mechanism according to claim 2 wherein said valve means comprises left and right steering valves, said power means comprises left and right power steering actuators, said connecting means connecting said valves and actuators for operation of said left valve to operate said right actuator and for operation of said right valve to operate said left actuator, means connecting said left actuator to exert steering pressure on said left wheel in one direction only and means connecting said right steering actuator to exert steering pressure on said right wheel in a second direction only, said second direction being opposite to said one direction.

4. A mechanism according to claim 3 wherein said locking means comprises a cam member, means pivotally mounting said cam member on said suspension means, means connecting said steering linkage means to said cam member for steering movement of said steering linkage means to rotate said cam member, said cam member having a cam surface, a locking member, means normally biasing said locking member against said cam surface to urge said cam member to a position in which said steering linkage is in its straightened position, and means responsive to operation of a said steering valve for moving said locking member away from said cam surface thus allowing said cam member to turn, said means for moving said locking member including means limiting movement of said locking member so that as said wheels turn, said locking member may engage said cam member thus to limit turning of said wheels.

5. A mechanism according to claim 4 wherein said steering linkage means includes left outer and inner steering links and right outer and inner steering links, said outer steering links being connected to said wheels and said inner steering links being connected to said cam member, said left valve being connected between said left outer and said left inner steering links and said right valve being connected between said right outer and said right inner steering links and each steering valve being capable of transmitting steering pressure in both said one direction and said second direction between the steering links connected thereto, said left and right valves each being operative in response to compression thereof and being rendered inoperative in response to tension exerted thereon.

6. A mechanism according to claim 4 wherein said steering linkage means includes left outer and inner steering links and right outer and inner steering links, said outer steering links being connected to said wheels and said inner steering links being connected to said cam member, said left valve being connected between said left outer and said left inner steering links and said right valve being connected between said right outer and said right inner steering links and each steering valve being capable of transmitting steering pressure in both said one direction and said second direction between the steering links connected thereto, said left and right valves each being operative in response to tension exerted thereon and being rendered inoperative in response to compression thereof.

7. A mechanism according to claim 4 wherein said cam surface includes a V-shaped indent and a curved surface extending on each side of said indent, said locking member having a pointed tip shaped to fit within said indent to lock said cam member against rotation when said tip is forced into and seated within said V-shaped indent.

8. A mechanism according to claim 7 wherein said means normally biasing said locking member against said cam includes a bias member, and a first spring normally urging said bias member against said locking member to force said locking member against said cam, said means for moving said locking member away from said cam surface including a second spring normally urging said locking member away from said cam surface, said second spring being of substantially less compressive strength than said first spring, and power means responsive to operation of a said steering valve for forcing said bias member away from said locking member, whereby said second spring may then move said tip of said locking member away from said cam surface.

9. A mechanism according to claim 8 wherein said steering valves are pneumatic valves, said power means for forcing said bias member away from said locking member being pneumatic means, said means for limiting movement of said locking member including pneumatic feed means connected between said steering valves and said locking means for feeding air at a controlled rate to said power means upon during operation of said steering valve, whereby to limit the speed of movement of said bias member away from said locking member, thus to limit the speed of movement of said locking member away from said cam surface.

* * * * *